United States Patent

Briles

Patent Number: 5,129,771
Date of Patent: *Jul. 14, 1992

[54] PRECISION RING DOME-HEADED RIVET

[75] Inventor: Franklin S. Briles, Fallbrook, Calif.

[73] Assignee: Briles Rivet Corporation, Oceanside, Calif.

[*] Notice: The portion of the term of this patent subsequent to Oct. 4, 2000 has been disclaimed.

[21] Appl. No.: 673,398

[22] Filed: Mar. 22, 1991

[51] Int. Cl.$^5$ ............... F16B 19/06; B21D 39/00
[52] U.S. Cl. ..................... 411/507; 411/504; 29/524.1; 29/525.2
[58] Field of Search ............... 411/504, 505, 506, 507; 29/509, 522.1, 525.2, 524.1

[56] References Cited

U.S. PATENT DOCUMENTS

| | | |
|---|---|---|
| 2,237,338 | 2/1939 | Dale . |
| 3,680,429 | 8/1972 | Briles . |
| 3,927,458 | 12/1975 | Speakman . |
| 4,000,680 | 1/1977 | Briles . |
| 4,051,592 | 10/1977 | Briles .......................... 411/507 X |
| 4,086,839 | 5/1978 | Briles ........................... 411/507 |
| 4,159,666 | 7/1979 | Briles ........................... 411/507 |

Primary Examiner—Neill R. Wilson
Attorney, Agent, or Firm—William W. Haefliger

[57] ABSTRACT

A workpiece having a bore, and a counterbore which is frusto-conical and tapers forwardly between a side of the workpiece and the bore, and toward the bore, a metallic rivet having an axially extending shank received in the workpiece bore and defining an axis; the rivet including a head having an end face and a forwardly tapered frusto-conical section located forwardly of the end face; the periphery of the head end face being substantially flush with the work surface, the end face forming a dome protruding axially in a rearward direction, the dome being generally ring-shaped and extending about the axis in substantially axial alignment with the outer surface of the shank; the rivet head having a peripheral side wall spaced radially from a side wall defined by the workpiece counterbore, and the space between the side walls having a volume A; the dome having a metallic volume B; and wherein the volume B exceeds volume A, such that when the dome is flattened during rivet deformation, the rivet head side wall is radially expanded into volume A and pushes outwardly against the workpiece counterbore side wall to deform the latter radially outwardly; and the radio B/A being within the range 1.20:1 and 70:1.

29 Claims, 4 Drawing Sheets 5,129,771

PRECISION RING DOME-HEADED RIVET

BACKGROUND OF THE INVENTION

This invention relates generally to fasteners, and more particularly concerns improvements in rivet-type fasteners having certain unusual advantages in construction, mode of installation and operation.

Experience with conventional rivet retention of aircraft skins to fuselage structures has indicated several disadvantages and problems, particularly where fully tapered rivet heads are employed to seat in tapered counterbores or countersinks. Due to requirements, especially in aircraft assembly, that the head not protrude from the work surface at the completion of riveting; it has been the practice to drill deep countersinks ensuring full reception of the head in the countersink; however, this frequently results in damage to the work or skin surrounding the countersink, caused by impact of the tool that strikes the rivet head during rivet upset formation. Also, deep countersinks reduce the shear bearing area of the skin. In an effort to alleviate this problem, rivet heads have been formed to incorporate rearwardly facing central domes, an example being that in U.S. Pat. No. 3,927,458. However, the flattening of such domes or crowns during riveting can result in the formation of unwanted clearances between the rivet heads and work countersinks, as for example can occur due to creation of unwanted metal spring-back conditions.

Further, fluids can and do enter the gap or clearance to cause corrosion of the connection over a period of time, creating a dangerous weakening of the connection. In addition, it is difficult to paint over the gap or clearance without resulting in paint cracking. Finally, it is found in practice that it is very difficult to make the peripheries of such rivets exactly round, which aggravates the above problems.

The rivet in U.S. Pat. No. 2,237,338 to Dale is thickened at the extreme outer edge of the head; however, seating and separation problems are encountered, as described in that patent.

U.S. Pat. No. 4,086,839 to applicant herein constitutes a substantial improvement in rivet construction over the prior art in existence at the time of the invention thereof. There is need for further improvements in such rivets, and as to their construction and use, enhancing reliability and ease of installation.

SUMMARY OF THE INVENTION

It is a major object of the invention to provide solutions to the above, as well as other problems, through the provision of a simple rivet and riveted connection incorporating a number of unusual advantages.

Basically, the invention is embodied in a rivet for combination with a workpiece having a bore, and a counterbore which is frusto-conical and tapers forwardly between a side of the workpiece and the bore, and toward the bore. The rivet is characterized by a) a metallic rivet body having an axially extending shank received in the workpiece bore and defining an axis, b) the rivet including a head having an end face and a forwardly tapered frusto-conical section located forwardly of the end face, c) the periphery of the head and face being substantially flush with the work surface, the end face forming a dome protruding axially in a rearward direction, the dome being generally ring-shaped and extending about the axis in substantially axial alignment with the outer surface of the shank, d) the rivet head having a peripheral side wall spaced radially from a side wall defined by the workpiece counterbore, and the space between the side walls having a volume A, e) the dome having a metallic volume B, f) and wherein volume B exceeds volume A, for ranges of A and B volumes, such that when the dome is flattened during rivet deformation, the rivet head side wall is assuredly radially expanded into volume A and pushes outwardly against the workpiece counterbore side wall to deform the latter radially outwardly.

Maximum volume A, with minimum volume B results, typically in the ratio of B to A within the range 1.20:1 to 70:1. Also, A is typically within the range 0.0000120 cubic inches and 0.000190 cubic inches; and B is within the range 0.0000125 cubic inches and 0.00090 cubic inches.

In another configuration, A is within the range 0.0000013 cubic inches and 0.000013 cubic inches; and wherein B is within the range 0.000029 cubic inches and 0.00088 cubic inches.

It is another object to provide an improved rivet wherein the rivet head dome has an annular crest portion in substantial axial alignment with the shank outer surface, and the dome radially outer extent which defines only about half of the dome being located in axially spaced relation to a forward taper defined by the forwardly tapered frusto-conical section, the dome crest portion being rearwardly convex in axial radial planes. In this regard, the head end face preferably forms a concave central recess radially inwardly of the crest portion, the outermost annular extent of the crest located approximately in alignment with the outer surface of the shank.

Additional objects include the provision of rivet metal softer than work metal, the rivet metal preferably consisting of one of the following:

i) aluminum
 ii) aluminum alloy
 iii) titanium
 iv) titanium alloy
 v) CRES alloy.

As will be seen, and in one example, the head maximum diameter is within the range 0.258 to 0.256 inches; and the head side wall has an axial length of about 0.024 inches.

Additionally, a further object is to provide head height, which includes the side wall length plus the axial length of the head that tapers toward the shank, is within the range 0.022 and 0.104 inches.

Yet another object is to provide a rivet head having h) a cylindrical section between the end face and the forwardly tapered frusto-conical section, i) a transitional section having a concave outer surface between the shank and the forwardly tapered frusto-conical section, j) the volumes of the cylindrical section, frusto-conical section, and the transitional section being in predetermined relation to the workpiece bore and cylindrical and tapered counterbore, such that upon flattening of the dome upon deformation, the dome has a flat head surface which lies between limits defined as flush with the workpiece surface
 protruding 0.008 inches from the workpiece surface.

Also, the head is typically characterized in that
k) the transitional section has a concave surface, in axial radial planes, with radius $R_1$,
l) the workpiece has a convex surface in axial radial planes, and with radius $R_2$, the convex surface slidably engageable by the concave surface upon rivet deformation,
m) and where $R_2$ is between 5% and 25% less than $R_1$, and the taper angularity of the frusto-conical section is 120°.

Further the crest portion of the annular dome typically lies between radially inner and outer limits such that the radial gap between the limits is less than 25% of the radial dimension of the dome cross section, the gap being in alignment with the shank outer surface.

These and other objects and advantages of the invention, as well as the details of an illustrative embodiment, will be more fully understood from the following specification and drawings, in which:

DRAWING DESCRIPTION

DETAILED DESCRIPTION

Figure 1:
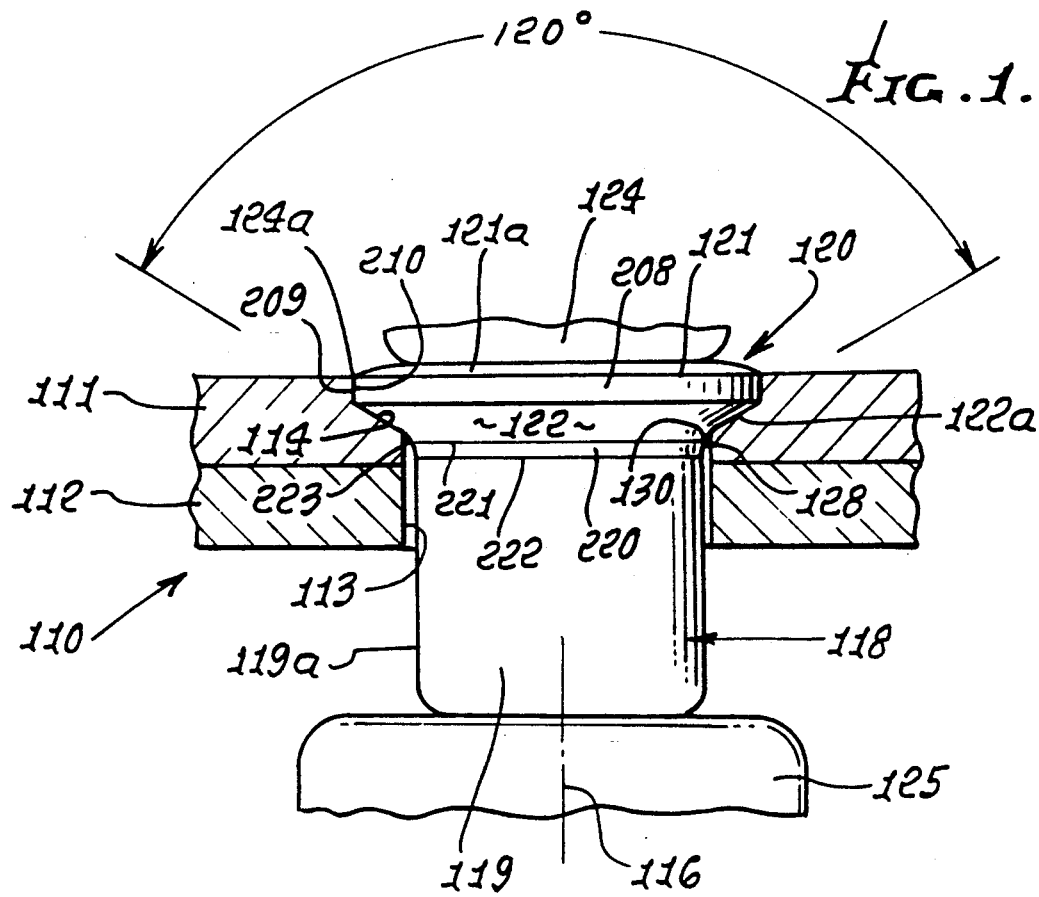
FIG. 1 is an elevation taken in section showing a rivet inserted in a workpiece.

In FIG. 1, the workpiece 110 includes two panels 111 and 112 (metal, glass fiber, composites, etc.). They contain a main bore 113 extending in both panels, a counterbore 210 and a tapered countersink 114 in panel 111. The bore and countersink have a common forwardly extending axis 116. Note annular corner 130 which is convex in axial radial planes.

A metallic rivet 118 has an axially extending shank 119 inserted forwardly in and through bore 113, with clearance as indicated, the rivet tail 119a projecting forwardly of panel 112. The rivet has a head 120 having an end face 121 facing rearwardly, a cylindrical section 208 bounded by cylindrical wall 209, and a forwardly tapered, frusto-conical section 122 spaced forwardly of section 208. A transitional section 220 is defined between planes 221 and 222, at the limits of the section concavely curved outer surface 223.

Figure 2:
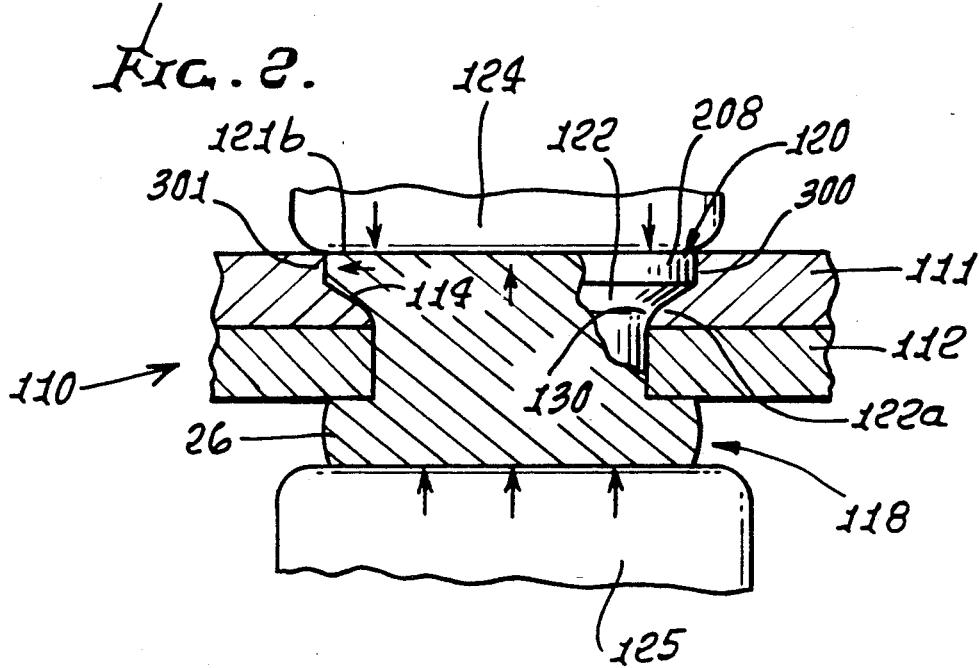
FIG. 2 is a view like FIG. 1 but showing the rivet after deformation.

The rivet is progressively deformed as by hammers 124 and 125 to flatten the head dome 121a and to form the upset 26 seen in FIG. 2. The arrows at the head 120 show the directions of metal deformation during flattening of the dome. In this regard, head metal adjacent tapered surface 122a tends to flow toward and around annular corner 130 at the intersection of bore 113 with countersink 114 due to the fact that force imparted to the rivet head by the hammer is centrally directed through the ring dome crest toward the corner 130 defining a convexly annular extrusion surface for rivet metal flow thereover. See rivet concave flow surface 223.

The improved rivet, as in FIG. 1, has an annular periphery 121a of the end face 121 that is substantially flush with the work surface 131; in addition, the end face forms a dome 132 protruding axially in a rearward direction, that dome being generally ring shaped and extending about axis 116. The extent of rearward protrusion of the dome is such that the entire end face 121 becomes substantially flush with the work surface, upon completion of rivet deformation, as indicated at 121b in FIG. 2, the dome being substantially eliminated.

The dome, being ring-shaped, is radially located rearwardly of the countersink 114, whereby the rivet head material remains in engagement with the countersink and does not form a clearance therewith in response to dome flattening. For best results, the dome radially outer extent 132a, which flares outwardly and forwardly, is substantially entirely located in axially spaced relation to the countersink, i.e., the tapered countersink 114. The flare at 132a, toward the head outermost periphery, is at an angle between 2° and 25° from a plane normal to axis 116. Further, the dome crest portion 132b is in substantial axial alignment with the shank outer surface 119b, and also work bore 113. The height "d" of the crest above surface 121 is between 0.002 and 0.016 inches, for best results, and within the ratios of B/A defined below.

Accordingly, all during the riveting process, the rivet head tapered surface 122a, throughout substantially its entire length, remains seated against the countersink and no spring-back is produced to the extent that clearance would develop.

Figure 3:
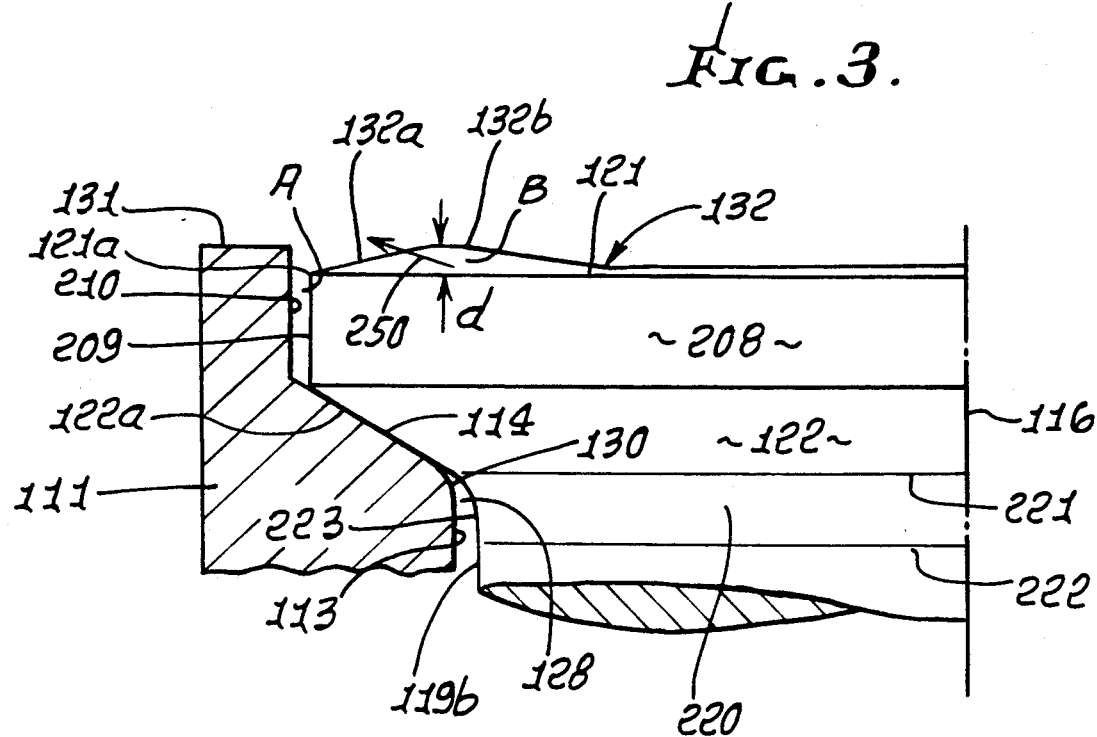
FIG. 3 is an enlarged fragmentary section showing a rivet head of one (minimum) size relationship to a work counterbore.

In this regard, note that the central concavity at 132 in FIG. 3 of the head rear face becomes filled-in during rivet head deformation, i.e., ring-dome flattening, and by shank material backfilling as the shank column collapses and expansion occurs. Deformation forces, indicated by the arrows in FIG. 2 remains concentrated in alignment with the countersink 114, whereby the head metal is constantly forcibly urged toward that countersink to prevent development of clearances.

As riveting proceeds, the head metal bounded by head wall 209, and located between dome 121 and section 122, is typically deformed toward work counterbore 210 (see FIG. 3) to fill the annular clearance volume A therebetween.

In actual practice, and as regards production rivets, and for best results, it is found that a size relationship is to be maintained between:

A - the volume of space between walls 209 and 210, and

B - the volume B of the annular metallic dome 132, above face 121.

That size relationship, prior to rivet deformation, requires that B exceed A such that when the dome is flattened during rivet deformation, the rivet head side wall is radially expanded into volume A and pushes outwardly against the workpiece counterbore side wall to deform the latter radially outwardly.

Figure 4:
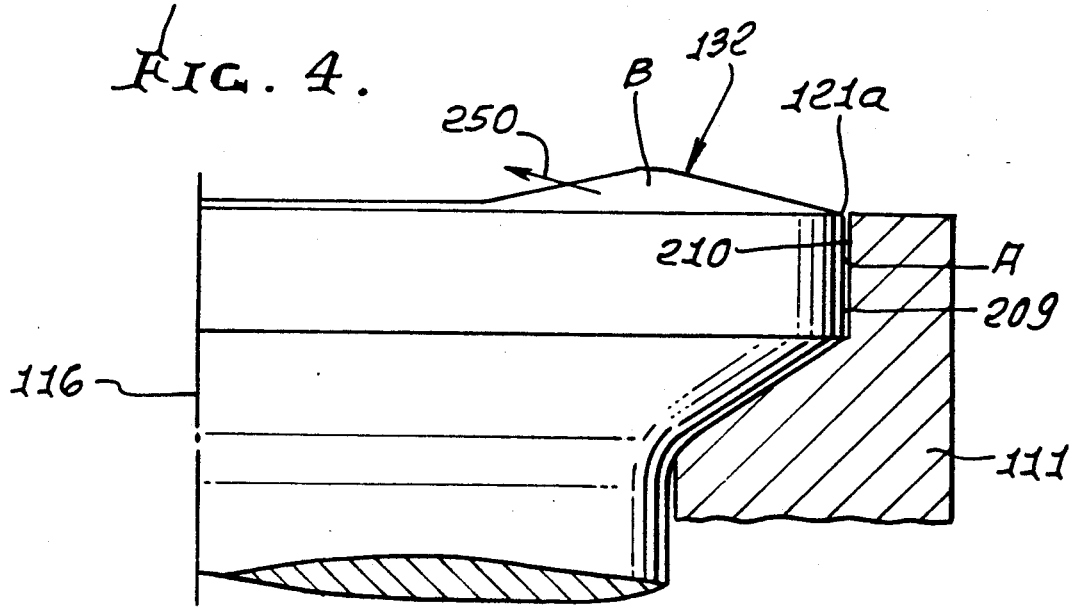
FIG. 4 is a view like FIG. 3 showing the rivet head of another (maximum) size relationship to a work counterbore.

FIG. 3 shows a minimum head diameter (at 209), maximum counterbore (at 210) relationship, whereby A is at a maximum and the rivet head seats forwardly at 114, as shown; and FIG. 4 shows a maximum head diameter (at 209), minimum counterbore (at 210) relationship, whereby A is at a minimum, and the rivet head seats rearwardly so that dome 132 protrudes rearwardly from the work, prior to deformation.

Typically, and for best results, the ratio of B to A is within the range 1.20:1 to 70:1 prior to deformation. Upon such deformation, counterbore 210 is expanded radially outwardly by expansion of wall 209, as the dome is flattened. Further, for the FIG. 3 interfit condition, as referred to, A should be or typically is within the range 0.0000120 cubic inches and 0.000190 cubic inches; and B should be or typically is within the range 0.0000125 cubic inches and 0.00090 cubic inches; and for the FIG. 4 interfit condition, as referred to, A should be or typically is within the range 0.0000013 cubic inches and 0.000013 cubic inches; and wherein B should be or typically is within the range 0.000029 cubic inches and 0.00088 cubic inches. Under these conditions, the desired deformation of the dome 132 will occur during riveting, to maintain the walls 209 and 210 in radial compression and peripheral tension, as desired. Note that in FIG. 3, when the dome is compressed axially, it tends to deform radially outwardly (see arrow 250) to assist in filling gap A; whereas in FIG. 4, with A at a minimum during initial interfit, the dome metal tends ultimately to flow radially inwardly into the central hollow (see arrow 251).

If the ratio of B to A is outside the range (as for example if B and A are numerically outside the limits referred to), there will be insufficient metal to fill volume A and deform 210 outwardly to produce radial compression and peripheral tension (after deformation), on the one head; or there will be an excess of metal, as from dome 132, to be deformed inwardly, thus creating a condition of excess protrusion of the head (non-flushness) after driving.

Typically, the rivet metal is softer than the work metal. For example, the rivet may have a tensile strength of at least about 14,000 psi and higher, and the work a tensile strength substantially in excess of the rivet tensile strength, for best results. The rivet and work may consist of like (or unlike) materials, such as aluminum, aluminum alloy, Monel, CRES (corrosion resistant steel) alloys, titanium or titanium alloy, for example. Thus, the rivet and work will expand and contract at the same rate to prevent radial gaps during temperature change. In certain instances, the rivet may be harder than the work. If desired, the rivet shank and the workbore may both be forwardly tapered to like extent.

In a typical example, the head maximum diameter is within the range 0.258 to 0.256 inches; and the head side wall has an axial length of about 0.012 to 0.042 inches. Also, the side wall length plus the axial length of the head that tapers toward the shank, is within the range 0.022 and 0.104 inches.

Figure 5:
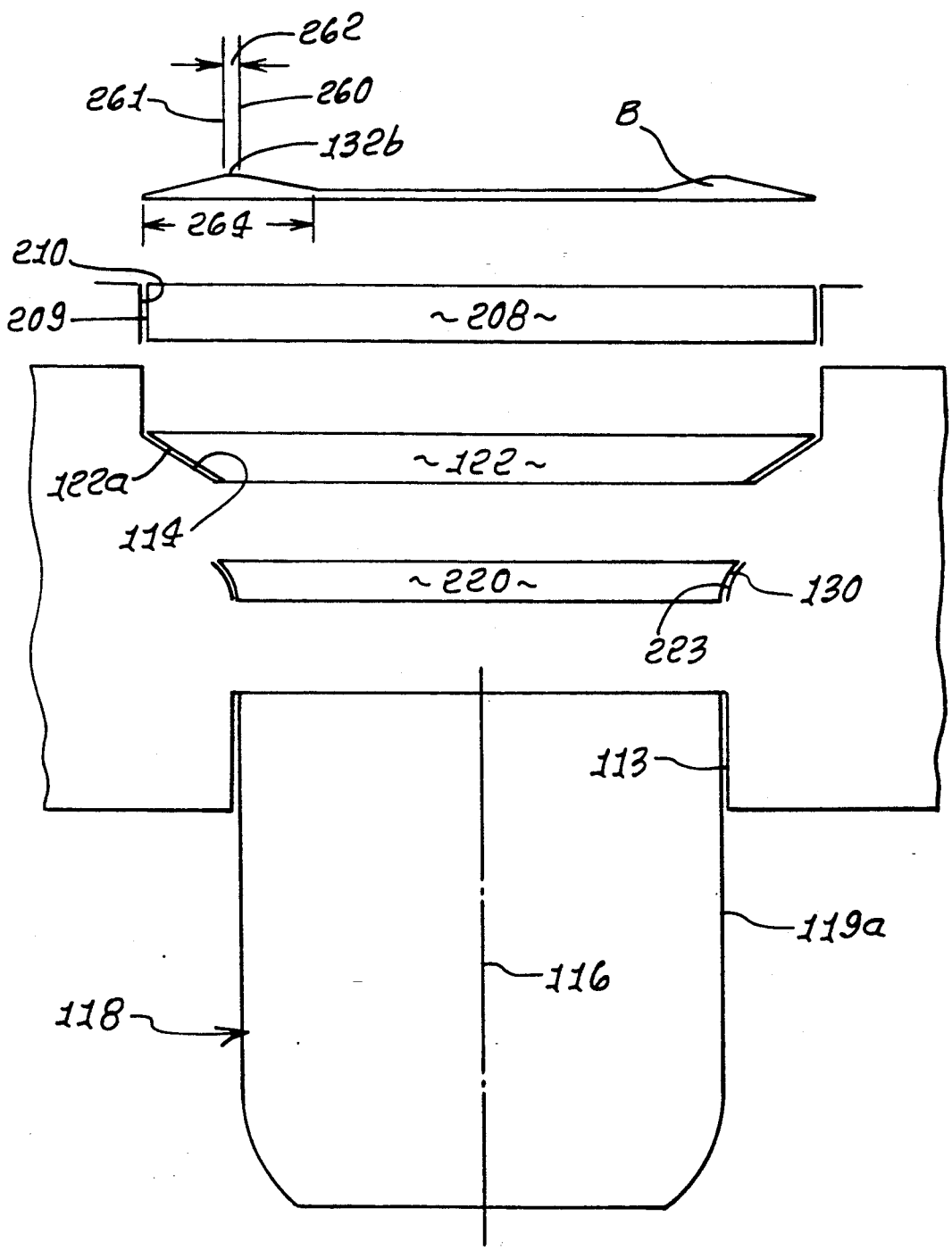
FIG. 5 is an exploded view showing elements of a rivet in relation to elements of a work bore and counterbore.

Referring now to FIG. 5, it is like FIG. 3, but shows elements axially exploded. Clearances are shown between wall 209 and counterbore 210, as exist upon rivet insertion (but prior to deformation), and between shank 119a and bore 113. Also, merely for better identification, slight axial separation is shown between tapered seat 114 and head tapered surface 114 (120° taper angle as seen in FIG. 1), and between convex corner 130 and concave outer surface 223 of transitional section 220.

In accordance with an important aspect of the invention, the volumes of the cylindrical section 208, frusto-conical section 122, and transitional section 220 are controlled, or predetermined, in relation to the dimensions diameter of the workpiece bore 113, and the dimensions (axial and radial) of the workpiece counterbores 114 and 210, such that upon flattening of the dome upon rivet deformation, the dome has a flattened surface which lies between limits defined as about
  flush with the workpiece outer surface
  protruding 0.008 inches from said workpiece outer surface.

This assures aerodynamic flushness.

Another important aspect lies in defining and maintaining two radii $R_1$ and $R_2$ such that $R_2$ is between 95% and 75% of $R_1$, (5%-25% difference) where:
  $R_1$ is the radius of concave surface 223 in axial radial planes (surface 223 being annular)
  $R_2$ is the radius of workpiece convex surface 130, in axial radial planes, surface 130 being annular and slidably engaged by surface 223 upon rivet deformation.

When these relationships are maintained, along with 120° taper angularity of surfaces 114 and 122a, (surface 114 intersecting surface 130, and surface 122a intersecting surface 223), the shear bearing support of the rivet is optimized, while tension pull-through capability of the rivet is assured. This advantage is realized even when installed in the thinnest possible sheet (i.e., near knife-edge condition), the areas 300 and 301 (FIG. 2) around the rivet head remain constant, assuring a high degree (40% minimum of the sheet) of shear bearing area of the sheet.

FIG. 5 also shows the annular crest portion 132b as located between radially inner and outer limits (see lines 260 and 261 parallel to axis 116) the radial gap 262 between lines 260 and 261 being less than 25% of the radial dimension 264 of the dome cross section, said gap being in alignment with the shank outer surface.

Figure 6A:
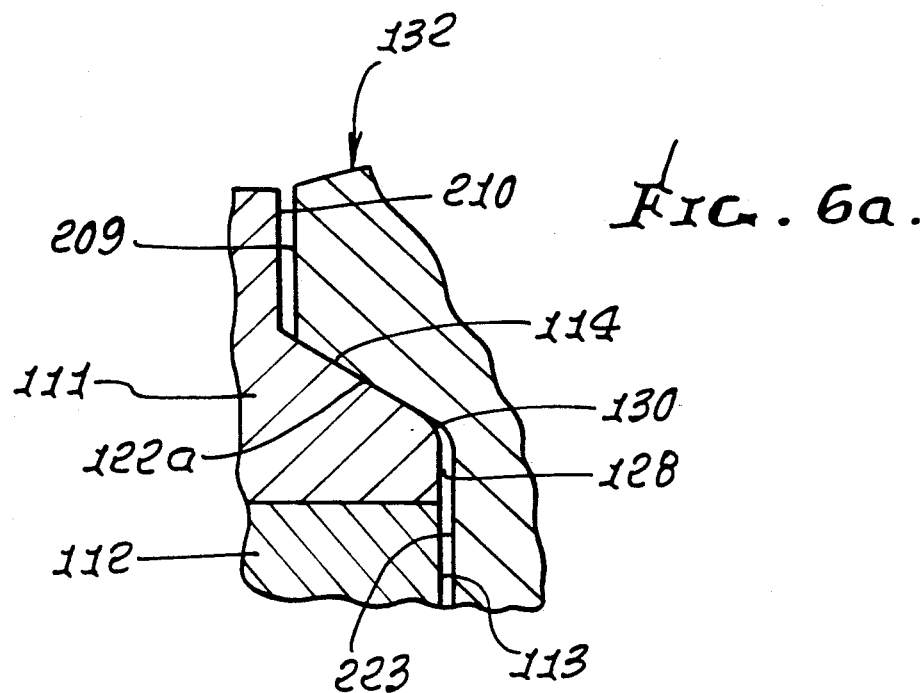
FIG. 6a is an enlarged section showing initial seating of a rivet in work sheets.
Figure 6B:
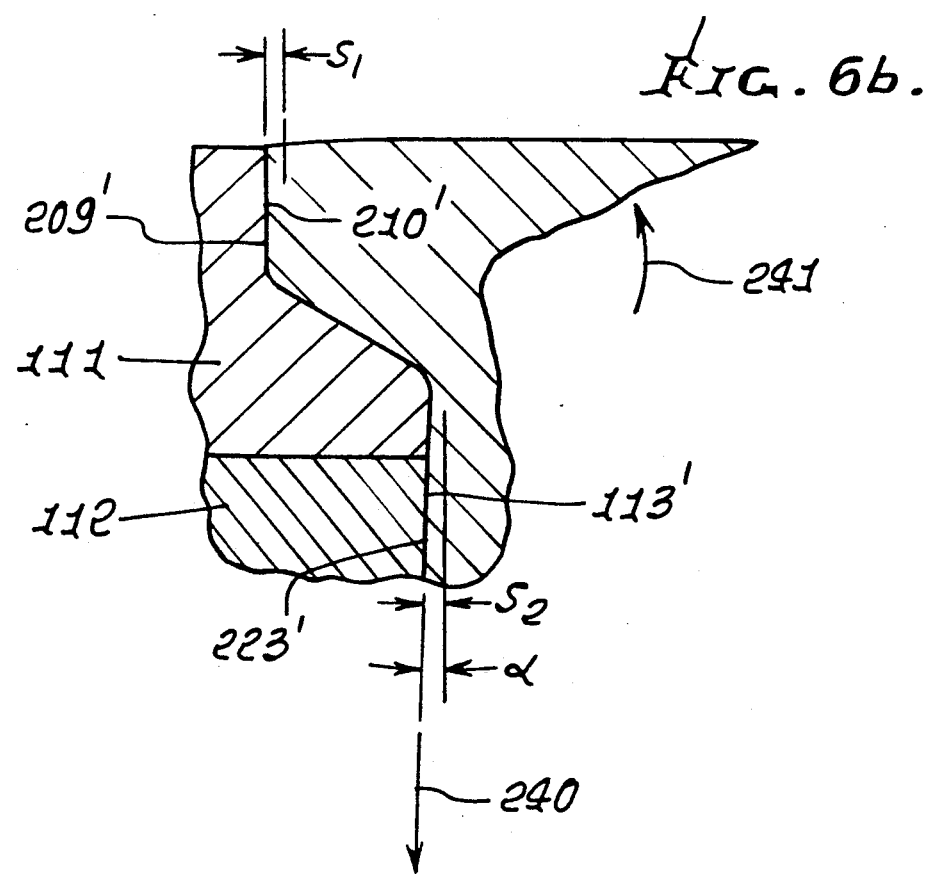
FIG. 6b is like FIG. 6a but shows the position of the rivet and sheets after driving of the rivet.

Comparison of FIGS. 6a and 6b show that during rivet deformation, head wall 209 moves radially outwardly (leftwardly) to engage bore wall 210; and wall 209 further displaces wall 210 leftwardly by amount $S_1$, the final wall positions indicated at 209' and 210'. At the same time, shank wall 223 moves radially outwardly (leftward) and engages bore wall 113; and wall 223 further displaces wall 113 leftwardly by approximate amount $S_2$, the final wall position indicated at 223' and 113'. In actuality, wall 223' extends at an angle $\alpha$ relative to its initial position 223, wall 223' flaring in direction 240. Further, rivet metal is displaced (see arrow 241) toward the head recess about which the dome 132 extends, in FIG. 6a, to fill that recess, as the ring dome is flattened. As a result, the deformed rivet locks the work sheets 111 and 112 in clamped-together condition.

I claim:

1. In combination with a workpiece having a bore, and a counterbore which is frusto-conical and tapers forwardly between a side of the workpiece and the bore, and toward the bore,
   a) a metallic rivet having an axially extending shank received in the workpiece bore and defining an axis,
   b) the rivet including a head having an end face and a forwardly tapered frusto-conical section located forwardly of said end face,
   c) the shank installed in said bore and said head installed in the counterbore such that the periphery of said head end face is substantially flush with the work surface, the end face forming a ring-shaped dome protruding axially in a rearward direction, said ring-shaped dome extending about said axis in substantially axial alignment with the outer surface of the shank, d) the rivet head having a peripheral side wall spaced radially from a side wall defined by the workpiece counterbore, and the space between said side walls having a volume A, e) said dome having a metallic volume B, f) and wherein volume B exceeds volume A, such that when the dome is flattened during rivet deformation, said rivet head side wall is radially expanded into volume A and pushes outwardly against said workpiece counterbore side wall to deform the latter radially outwardly, g) the ratio B/A being within the range 1:20:1 to 70:1, h) and wherein A and B have one of the following two relationships:

$X_1$) A is within the range 0.0000120 cubic inches and 0.000190 cubic inches; and B is within the range 0.0000125 cubic inches and 0.00090 cubic inches;

$X_2$) A is within the range 0.0000013 cubic inches and 0.000013 cubic inches; and wherein B is within the range 0.000029 cubic inches and 0.00088 cubic inches.

2. The combination of claim 1 wherein the dome has an annular crest portion in substantial axial alignment with said shank outer surface, and the dome radially outer extent which defines only about half of the dome being located in axially spaced relation to a forward taper defined by said forwardly tapered frusto-conical section, said dome crest portion being rearwardly convex in axial radial planes.

3. The combination of claim 2 wherein the head end face forms a concave central recess radially inwardly of said crest portion, the outermost annular extent of said crest located approximately in alignment with the outer surface of the shank.

4. The combination of claim 1 wherein both the rivet and work are metallic, the rivet metal being softer than the work metal.

5. The combination of claim 1 wherein the rivet is metallic and consists of one of the following:
   i) aluminum
   ii) aluminum alloy
   iii) titanium
   iv) titanium alloy
   v) CRES alloy.

6. The combination of claim 1 wherein the work metal end face, about the counterbore, is deformed radially and forwardly during said riveting to flatten the ring dome.

7. The combination of claim 1 wherein the head maximum diameter is within the range 0.121 to 0.521 inches.

8. The combination of claim 1 wherein said head side wall has an axial length of about 0.012 to 0.042 inches.

9. The combination of claim 1 wherein the head height, which includes the side wall length plus the axial length of the head that tapers toward the shank, is within the range 0.022 and 0.104 inches.

10. The combination of claim 1 wherein the head has
   h) a cylindrical section between said end face and said forwardly tapered frusto-conical section,
   i) a transitional section having a concave outer surface between said shank and said forwardly tapered frusto-conical section,
   j) the volumes of said cylindrical section, frusto-conical section, and said transitional section being in predetermined relation to the workpiece bore and cylindrical and tapered counterbore, such that upon flattening of the dome upon deformation, the dome has a flat head surface which lies between limits defined as
   flush with the workpiece surface
   protruding 0.008 inches from said workpiece surface.

11. The combination of claim 10 wherein
   k) the transitional section has a concave surface, in axial radial planes, with radius $R_1$,
   l) the workpiece has a convex surface in axial radial planes, and with radius $R_2$, said convex surface slidably engageable by said concave surface upon rivet deformation,
   m) and where $R_2$ is between 5% and 25% less than $R_1$, and the taper angularity of said frusto-conical section is 120°.

12. The combination of claim 2 wherein annular crest portion lies between radially inner and outer limits such that the radial gap between said limits is less than 25% of the radial dimension of the dome cross section, said gap being in alignment with the shank outer surface.

13. The combination of claim 1 wherein the workpiece comprises two sheets and when the dome is flattened during rivet deformation, the shear load bearing areas around the expanded rivet head have thickness which remains at least 40% of the thickness of the workpiece sheet in which the head is located.

14. In the method of connecting two workpiece sheets using a rivet, one sheet having a bore, and a counterbore which is frusto-conical and tapers forwardly between a side of the one sheet and the bore, and toward the bore, the steps that include:
   a) providing a metallic rivet having an axially extending shank defining an axis,
   b) providing the rivet with a head having an end face and a forwardly tapered frusto-conical section located forwardly of said end face,
   c) installing said shank in said bore and said head in the counterbore so that the periphery of said head end face is substantially flush with the work surface, the end face formed to provide a ring-shaped dome protruding axially in a rearward direction, said dome located to extend about said axis in substantially axial alignment with the outer surface of the shank,
   d) the rivet head provided with a peripheral side wall spaced radially from a side wall defined by the workpiece counterbore, and the space between said side walls having a volume A,
   e) said dome provided with a metallic volume B,
   f) and wherein volume B exceeds volume A, such that when the dome is flattened during rivet deformation, said rivet head side wall is radially expanded into volume A and pushes outwardly against said workpiece counterbore side wall to deform the latter radially outwardly,
   g) the ratio B/A being within the range 1:70:1 to 70:1.

15. The method of claim 14 wherein dome flattening is carried out so that the shear load bearing areas around the expanded rivet head have thickness which remains at least 40% of the thickness of the workpiece sheet in which the head is located.

16. The method of claim 17 wherein A is provided to be within the range 0.0000120 cubic inches and 0.000190 cubic inches; and B is provided to be within the range 0.0000125 cubic inches and 0.00090 cubic inches.

17. The method of claim 14 including forming the dome to have an annular crest portion in substantial axial alignment with said shank outer surface, and the dome radially outer extent which defines only about half of the dome being located in axially spaced relation to a forward taper defined by said forwardly tapered frusto-conical section, said dome crest portion being rearwardly convex in axial radial planes.

18. The method of claim 17 wherein the head end face is formed to have a concave central recess radially inwardly of said crest portion, the outermost annular extent of said crest located approximately in alignment with the outer surface of the shank.

19. The method of claim 14 wherein both the rivet and work are metallic, the rivet metal being softer than the work metal.

20. The method of claim 14 wherein the rivet is metallic and consists of one of the following:
   i) aluminum
   ii) aluminum alloy
   iii) titanium
   iv) titanium alloy
   v) CRES alloy.

21. The method of claim 14 wherein the work metal end face, about the counterbore, is deformed radially and forwardly during said rivet deformation to flatten the ring dome.

22. The method of claim 14 wherein the head maximum diameter is within the range 0.121 to 0.521 inches.

23. The method of claim 14 wherein said head side wall has an axial length of about 0.012 to 0.042 inches.

24. The method of claim 14 wherein the head height, which includes the side wall length plus the axial length of the head that tapers toward the shank, is within the range 0.022 and 0.104 inches.

25. The method of claim 14 wherein the head has
   h) a cylindrical section between said end face and said forwardly tapered frusto-conical section,
   i) a transitional section having a concave outer surface between said shank and said forwardly tapered frusto-conical section,
   j) the volumes of said cylindrical section, frusto-conical section, and said transitional section being predetermined relative to the workpiece bore and cylindrical and tapered counterbore, such that upon flattening of the dome upon deformation, the dome has a flat head surface which lies between limits defined as
   flush with the workpiece surface
   protruding 0.008 inches from said workpiece surface.

26. The method of claim 25 wherein
   k) the transitional section has a concave surface, in axial radial planes, and formed with radius $R_1$,
   l) the workpiece has a convex surface in axial radial planes, and formed with radius $R_2$, said convex surface sildably engageable by said concave surface upon rivet deformation,
   m) and where $R_2$ is between 5% and 25% less than $R_1$, and the taper angularity of said frusto-conical section is 120°.

27. The method of claim 17 wherein said annular crest portion is positioned to lie between radially inner and outer limits such that the radial gap between said limits is less than 25% of the radial dimension of the dome cross section, said gap being positioned in alignment with the shank outer surface.

28. The method of claim 14 wherein A is within the range 0.0000013 cubic inches and 0.000013 cubic inches; and wherein B is within the range 0.000029 cubic inches and 0.00088 cubic inches.

29. The method of claim 14 wherein the workpiece comprises two sheets, and wherein the dome is flattened during rivet deformation so that the shear load bearing areas around the expanded rivet heat have thickness which remains at least 40% of the thickness of the workpiece sheet in which the head is located.

* * * * *